US006070055A

United States Patent [19]

Uchida

[11] Patent Number: 6,070,055

[45] Date of Patent: May 30, 2000

[54] RADIO SELECTIVE CALLING RECEIVER WITH DISPLAY AND LIMITED FUNCTION MENU

[75] Inventor: Jun Uchida, Shizuoka, Japan

[73] Assignee: NEC Corporation, Tokyo, Japan

[21] Appl. No.: 09/009,614

[22] Filed: Jan. 20, 1998

[30] Foreign Application Priority Data

Jan. 24, 1997 [JP] Japan .................................... 9-011463

[51] Int. Cl.[7] ........................................................ H04Q 3/00

[52] U.S. Cl. ......................... 455/38.4; 455/418; 455/566; 340/825.44

[58] Field of Search .................................... 455/38.4, 566, 455/67.7, 418, 575, 158.4, FOR 121; 345/100, 50, 204; 340/825.44

[56] References Cited

U.S. PATENT DOCUMENTS 5,479,476 12/1995 Finke-Anlauff ......................... 455/418

FOREIGN PATENT DOCUMENTS 6-152497 5/1994 Japan .

*Primary Examiner*—Lee Nguyen

*Attorney, Agent, or Firm*—Scully, Scott, Murphy & Presser

[57] ABSTRACT

A radio selective calling receiver with display, having a plurality of functions which can be set by a user, including a menu window display unit for displaying the plurality of functions which can be set. A function use/disuse setting determination unit is provided for setting use/disuse of one of the plurality of functions displayed on a menu window, and a function limiting/displaying unit for displaying only functions for use on the menu window through the menu window display in function setting after setting use/disuse of the function.

4 Claims, 4 Drawing Sheets

RADIO SELECTIVE CALLING RECEIVER WITH DISPLAY AND LIMITED FUNCTION MENU

BACKGROUND OF THE INVENTION

1. Field of the Invention

The present invention relates to a radio selective calling receiver with display, which can set a plurality of functions (to be referred to as menus or MENUS hereinafter).

2. Description of the Prior Art

Recently, radio selective calling receivers are preferred by users in a wide age bracket and being equipped with not only a message reception/notification function but also a variety of menus. The number and display/set order of menus are generally determined by the maker in advance. However, some menus may be unnecessary for a user of the radio selective calling receiver. In addition, when there are a plenty of menus, a long time is required to select a menu with low selection priority, resulting in a cumbersome operation for the user.

To solve the above problem and provide high operability to the user, a radio selective calling receiver disclosed in Japanese Unexamined Patent Publication No. 6-152497 automatically changes the menu selection order in accordance with the use frequency of each menu.

To automatically change the menu selection order in accordance with the use frequency of each menu, the radio selective calling receiver of the above prior art requires a storage unit for storing the use frequency of each menu and an arithmetic unit for calculating the selection priority of each menu on the basis of the use frequency information. Since these circuits need a large storage area and a large program area, the radio selective calling receiver which must be reduced in size can hardly be equipped with the storage unit or arithmetic unit in practice.

SUMMARY OF THE INVENTION

The present invention has been made in consideration of the above situation, and has as its object to provide a radio selective calling receiver with display in which a user can easily set menus.

In order to achieve the above object, according to the first aspect of the present invention, there is provided a radio selective calling receiver with display, having a plurality of functions which can be set by a user, comprising, menu window display means for displaying the plurality of functions which can be set, function use/disuse setting determination means for setting use/disuse of one of the plurality of functions displayed on a menu window, and function limiting/displaying means for displaying only functions for use on the menu window through the menu window display means in function setting after setting use/disuse of the function.

According to the second aspect of the present invention, there is provided a radio selective calling receiver with display wherein the function use/disuse setting determination means of the first aspect sets use/disuse of the function in accordance with a program which is prepared in advance.

According to the third aspect of the present invention, there is provided a radio selective calling receiver with display of the first aspect, further comprising an erasable read only memory storing information of the function set for use.

According to the fourth aspect of the present invention, there is provided a radio selective calling receiver with display of the first aspect, wherein a timepiece function can be displayed independently of setting of use/disuse of the function by the function use/disuse setting determination means.

According to the present invention having the above aspects, menus which need not be set for the user can be easily deleted from the menu setting operation, and consequently, desired menus can be easily and quickly set.

The above and many other advantages, features and additional objects of the present invention will become manifest to those versed in the art upon making reference to the following detailed description and accompanying drawings in which preferred embodiments incorporating the principles of the present invention are shown by way of illustrative examples.

BRIEF DESCRIPTION OF THE DRAWINGS

FIGS. 2A to 2D are views showing display screens associated with menu use/disuse setting in the embodiment shown in FIG. 1, in which FIG. 2A shows a wait state, FIG. 2B shows a menu window, FIG. 2C shows a menu selection window, and FIG. 2D shows a window in determining menu use/disuse setting;

DETAILED DESCRIPTION OF THE PREFERRED EMBODIMENT

A preferred embodiment of the present invention will be described below with reference to the accompanying drawings.

Figure 1:
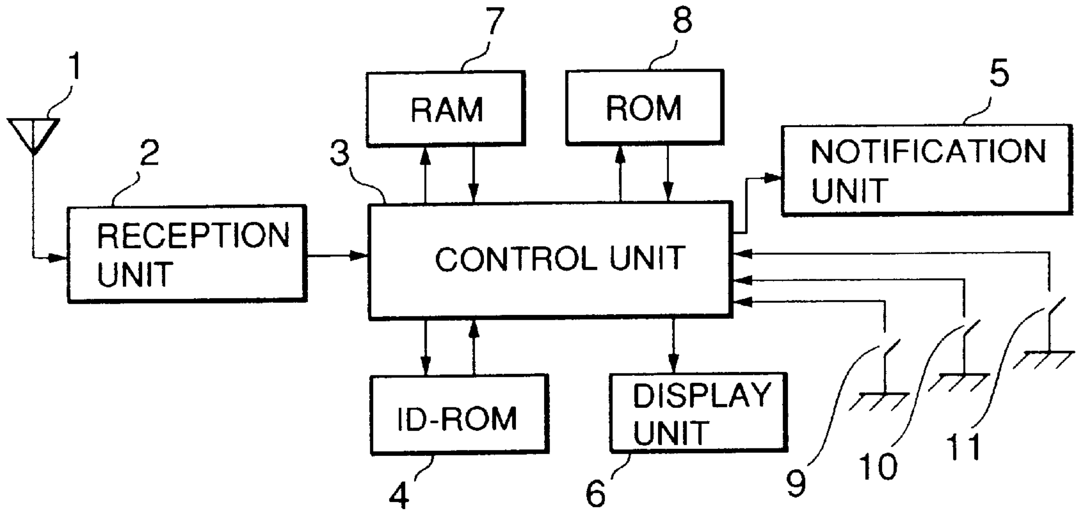
FIG. 1 is a block diagram showing the arrangement of a radio selective calling receiver with display according to an embodiment of the present invention.

FIG. 1 is a block diagram showing the arrangement of a radio selective calling receiver with display according to an embodiment of the present invention.

An antenna 1 of the radio selective calling receiver with display shown in FIG. 1 receives a radio signal from a paging system to which the receiver belongs. The radio signal is demodulated to baseband data by a reception unit 2 and sent to a control unit 3. The control unit 3 compares a selective calling number in the data with the self selective calling number stored in an ID-ROM 4 as an erasable read only memory. If the two numbers match, calling notification is made by a notification unit 5. When a message is contained in the data, the message is displayed on a display unit 6. After display, the message is stored in a RAM 7.

For this radio selective calling receiver with display, the user can set a plurality of menus. Control information associated with these menus is described in a program stored in a ROM 8. The control unit 3 performs control associated with the menus in accordance with this program. Switches 9, 10, and 11 are also associated with menu selection/setting. Use (ON) or disuse (OFF) of menu selection/setting is determined by operating the switches 9 to 11 while observing the screen of the display unit 6. The ID-ROM 4 stores not only an address unique to the radio selective calling receiver and various setting information but also menu use/disuse information.

FIGS. 2A to 2D are explanatory views associated with menu use/disuse setting in the radio selective calling receiver with display shown in FIG. 1. FIGS. 2A to 2D show the display screen of the display unit 6 in various states of menu use/disuse setting.

Figure 2A:
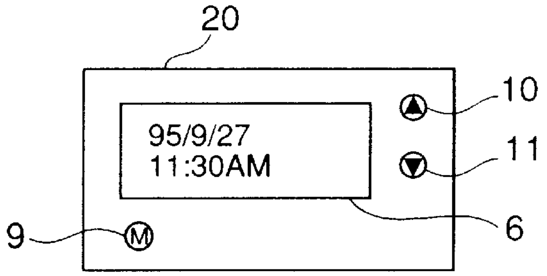

Referring to FIG. 2A, the display screen of the display unit 6 and the switches 9 to 11 are arranged on one surface of an outer case 20 of the radio selective calling receiver with display shown in FIG. 1. The switch 9 has a button with a symbol M, so the switch 9 is sometimes called an M-button (menu button). The switches 10 and 11 have buttons with symbols ▲ and ▼, so the switches 10 and 11 are sometimes called ▲- and ▼- buttons, respectively. In a message wait state, time is displayed on the display unit 6, as shown in FIG. 2A.

Figure 2B:
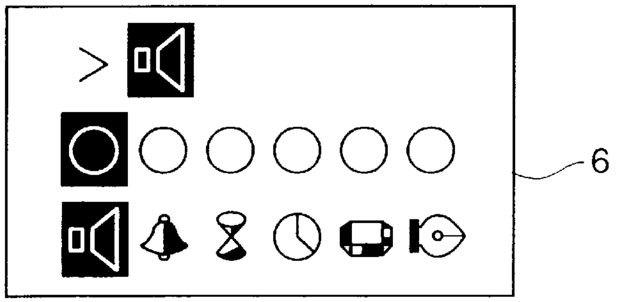

When the switch 9 is depressed, a menu window indicating menus which can be set is displayed on the display screen of the display unit 6 (FIG. 2B). The menu window has a three-line display. Six icons representing the types of menus are displayed on the third line. From the left, the menu icons are "alert" for selecting the calling mode from monotone sound generation, melody sound generation, and vibration, "alarm" for setting a calling time, "timer" for setting a time from the current time to a calling time, "clock" (timepiece) for setting time, "options" for setting the calling time length, designating the message read scroll, or setting the calendar display mode, and "preset" for preparing a free pattern text. These icons will be referred to as "mark A", "mark B", "mark C", "mark D", "mark E", and "mark F" hereinafter. Icons on the second line indicate use of menus on the third line by "0" and disuse by "x". A flickering icon on the first line represents the menu under selection. When the switch 9 is depressed, icons on the second and third lines, which are being selected, are inversely displayed.

On the menu window, the switch 11 is depressed to select a desired menu. When the switch 10 is depressed at a portion where the desired menu is flickering, the menu is set for use (ON). After this, this menu can be used.

Figure 2C:
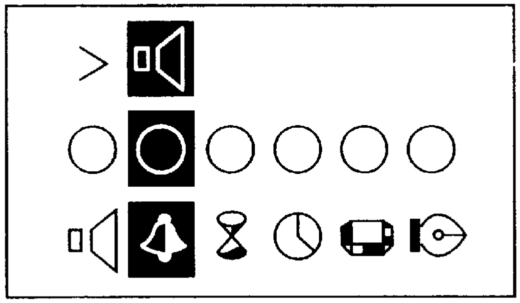

When the switch 9 is depressed to display the menu window shown in FIG. 2B, of the menu icons, "mark A" and "0" at the left end are inversely displayed. In the example shown in FIG. 2B, "0" indicating that all menus are set for use are displayed on the second line. In the example shown in FIG. 2B, "alert" is to be set in the ON state. For this reason, the switch 11 is depressed without changing "0" on the second line, thereby moving the inverse display to the icon (mark B) on the right side (FIG. 2C).

Figure 2D:
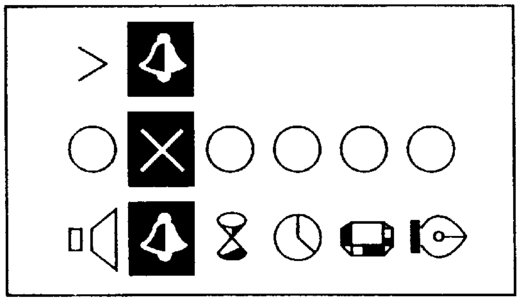

When the switch 10 is depressed, icons on the second and third lines, which correspond to "mark B", start to flicker. When the switch 11 is depressed during flickering of "mark B", "0" on the second line changes to "x" (FIG. 2D). If "x" is displayed on the second line, "x" on the second line changes to "0" upon depressing the switch 11. The switch 10 is depressed after "x" is set on the second line by depressing the switch 11. The menu corresponding to "mark B" is set for disuse (OFF). Subsequent menu selection and menu use/disuse setting are made following the same procedure as described above.

In the radio selective calling receiver with display shown in FIG. 1, the menu use/disuse as described above with reference to FIGS. 2A to 2D can be designated by programming. Specific programming software for writing the self selective calling number or reception frequency is used as the programming software, thereby writing menu use/disuse information. The menu use/disuse information is stored in the ID-ROM 4 both in the specific programming control and in setting by the user operation.

In addition to the frequency information area and selective calling number area, a storage area for storing information associated with menus is also allocated to the ID-ROM 4. More specifically, one bit is allocated to one menu. If this bit is "0", the menu is OFF. If this bit is "1", the menu is ON. Every time a switching operation associated with menus is performed, the control unit 3 reads information stored in the ID-ROM 4, and determines on the basis of the readout information whether the menu is to be displayed.

In this radio selective calling receiver with display, the timepiece sometimes stops due to a dead battery, and the control state returns to the initial value. In this case, even when the ID-ROM 4 stores information representing that the clock (timepiece) function is in the disuse (OFF) state, the control unit 3 sets the clock function for use (ON) upon confirming that the battery is reinserted, and the timepiece has returned to the initial value. If the time is to be set in the OFF state of the clock function, the clock function must be set in the ON state again. With the above arrangement, this cumbersome operation can be avoided.

Figure 3:
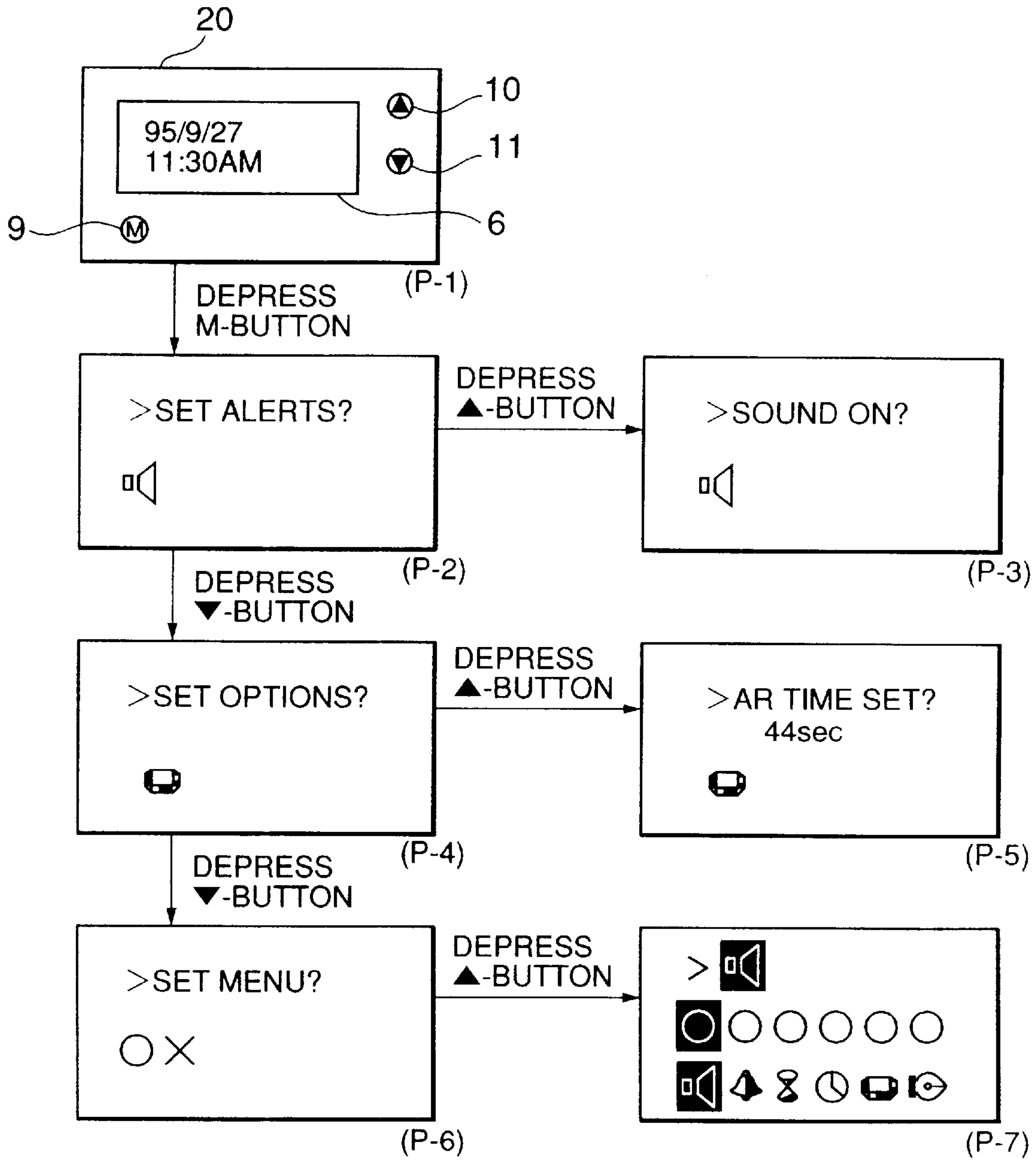
FIG. 3 is an explanatory view showing display screens corresponding to the flow of menu setting in the embodiment shown in FIG. 1.

FIG. 3 is a view showing the flow of menu setting after menu use/disuse determination of the radio selective calling receiver with display of this embodiment.

In FIG. 3, only two menus, i.e., the alert function and the optional function are set in the ON state while the remaining four functions are set in the OFF state. That is, the optional function can be set next to the alert function by the second selection. In the menu setting window shown in FIG. 2B, the optional function is the sixth menu in the selection order. However, in this embodiment, the optional function can be set in a selection time 1/3 that for the example shown in FIG. 2B by setting four unnecessary menus in the OFF state. As described above, a user who often uses the optional function can easily set the menu as compared to the above-described case.

The flow of menu setting shown in FIG. 3 will be described in more detail. When the M button 9 is depressed in the wait state (P-1) wherein time is displayed on the display unit 6, a window for asking about the necessity of alert setting (>SET ALERT?) is displayed on the display unit 6 (P-2). When the ▲-button 10 is depressed, the window changes to (>SOUND ON?) (P-3), and the alert setting operation is enabled. If alert setting is compete, or alert setting need not be made, the ▲-button 10 is depressed to set the next menu, i.e., the optional function.

The optional function setting window is (>SET OPTION?) (P-4). Upon depressing the ▲-button 10, the window changes to (>AR TIME SET?) (P-5), and the option setting operation is enabled. If option setting is compete, or option setting need not be made, the ▼- button 11 is depressed to display the menu use/disuse determination window (>SET MENU?) (P-6). If the use/disuse of the menu need not be changed, the ▼button 11 is depressed to end the menu setting operation. The display unit 6 returns to the wait state in P-1. When the menu use/disuse state need be changed, the ▲-button 10 is depressed to display the menu window of the menu use/disuse setting mode shown in FIG. 2B on the display unit 6 (P-7).

Figure 4:
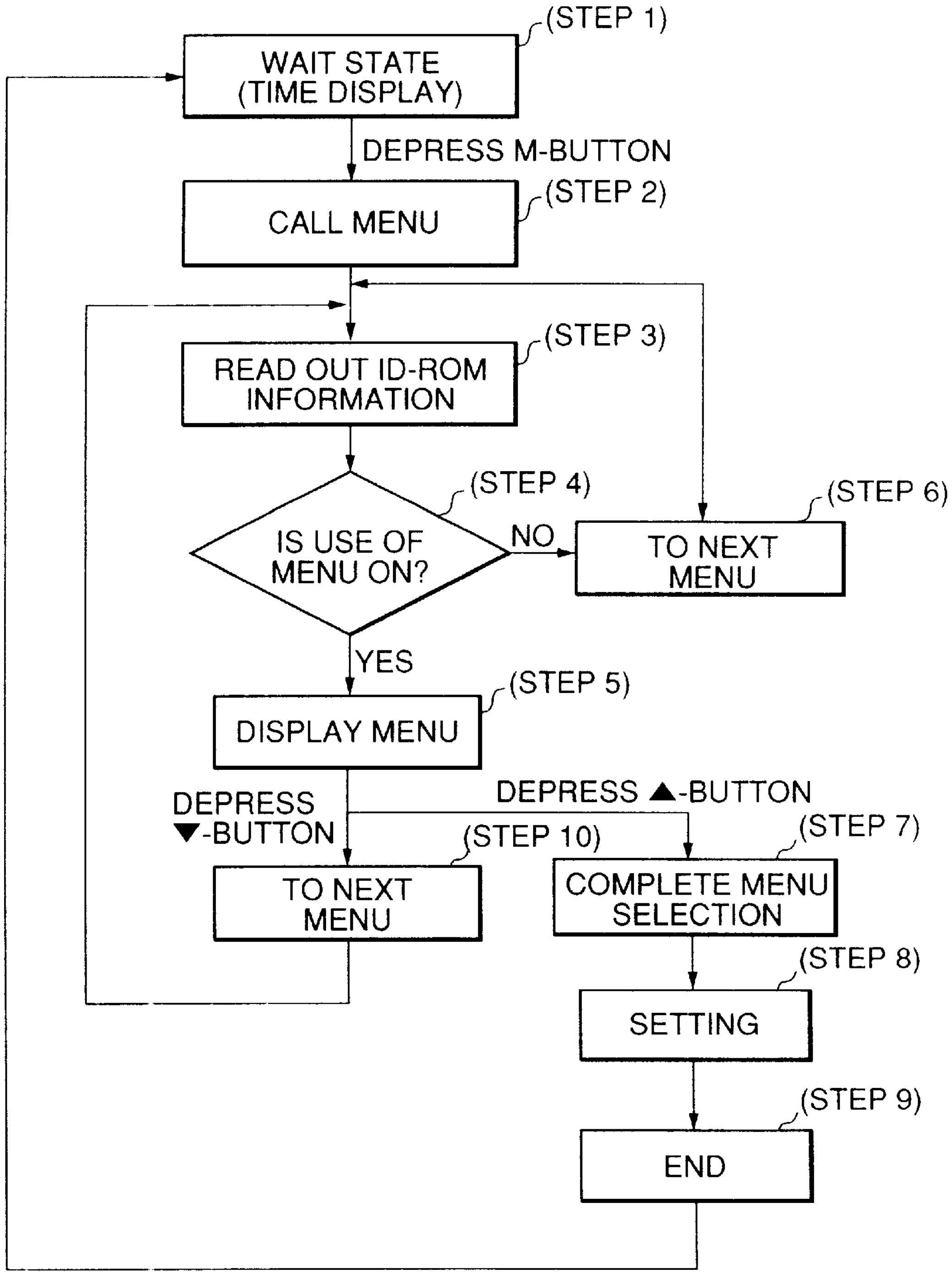
FIG. 4 is a flow chart of menu setting after menu use/disuse determination.

FIG. 4 is a flow chart of menu setting after menu use/disuse determination.

In the radio selective calling receiver with display of this embodiment, the display unit 6 displays time in the message wait state (step 1). Upon depressing the switch 9 (M-button), the control unit 3 starts the menu calling operation (step 2). The control unit 3 instantaneously reads out menu use/disuse information of the first menu (step 3) and determines whether use of the menu is ON (step 4).

If use of the first menu is ON (YES in step 4), the control unit 3 causes the display unit 6 to display the menu (step 5).

If use of the first menu is OFF (NO in step 4), the operation shifts to the next menu without displaying the first menu (step 6). The control unit 3 reads out use/disuse information of the menu (step 3) and determines whether use of the menu is ON (step 4).

When the switch 10 (▲- button) is depressed while the menu is being displayed on the display unit 6 in step 5, the control unit 3 completes selection of the menu which is being displayed (step 7), sets the menu (step 8), controls completion of menu setting (step 9), and returns the control to the wait state in step 1.

When the switch 11 (▼- button) is depressed while the menu is being displayed on the display unit 6, the control unit 3 instantaneously shifts to calling of the next menu without setting the first menu (step 10). The control unit 3 reads out from the ID-ROM use/disuse setting information of the menu to which the operation is shifted (step 3) and determines whether use of the menu is ON (step 4). If use of the menu is ON (YES in step 4), the control unit 3 causes the display unit 6 to display the menu (step 5). If use of the menu is OFF (NO in step 4), the operation shifts to the next menu without displaying the first menu (step 6). These steps are repeated.

As has been described above, the radio selective calling receiver with display according to this embodiment can easily delete menus which need not be set for a user from the menu setting operation, so the receiver operation becomes simple for the user. Menus for disuse can also be deleted from the menus which can be set, using a program in, e.g., the shop of the receiver, so the load of the button operation on the user can be further reduced.

Use/disuse of a menu is determined by the user operation or program setting. For this reason, the storage unit or arithmetic unit of this radio selective calling receiver requires neither a large menu use frequency storage area nor a large program area, so size reduction and a decrease in cost of the radio selective calling receiver can be easily achieved.

What is claimed is:

1. A radio selective calling receiver with display, having a plurality of functions which can be set by a user, comprising:

menu window display means for displaying a full menu comprised of all of the full plurality of functions which can be set;

function use/disuse setting determination means for setting use/disuse of each one of the full plurality of functions displayed on the full menu, wherein only the use functions which have been set form a selected limited menu which does not have the full plurality of functions of the full menu; and function limiting/displaying means for displaying only the limited menu comprised of only the use functions which have been set for use on said menu window display means in function setting after setting use/disuse of the function, wherein a user needs only select through and adjust each function on the limited menu, to avoid a more time consuming task of selecting through each of the full plurality of functions in the full menu.

2. A receiver according to claim 1, wherein said function use/disuse setting determination means sets use/disuse of the function in accordance with a program which is prepared in advance.

3. A receiver according to claim 1, further comprising an erasable read only memory storing information of the function set for use.

4. A receiver according to claim 1, wherein even when a battery is dead and to be exchanged for a new one, only a timepiece function is being set by a control unit to a ON state regardless of setting of use/disuse of the function by said function use/disuse setting determination means.

* * * * *